(12) United States Patent
Huang

(10) Patent No.: US 11,216,111 B2
(45) Date of Patent: Jan. 4, 2022

(54) POLARIZER AND DISPLAY PANEL

(71) Applicant: TCL CHINA STAR OPTOELECTRONICS TECHNOLOGY CO., LTD., Guangdong (CN)

(72) Inventor: Gu Huang, Guangdong (CN)

(73) Assignee: TCL CHINA STAR OPTOELECTRONICS TECHNOLOGY CO., LTD, Guangdong (CN)

( * ) Notice: Subject to any disclaimer, the term of this patent is extended or adjusted under 35 U.S.C. 154(b) by 182 days.

(21) Appl. No.: 16/624,310

(22) PCT Filed: Dec. 6, 2019

(86) PCT No.: PCT/CN2019/123470
§ 371 (c)(1),
(2) Date: Dec. 19, 2019

(87) PCT Pub. No.: WO2021/103104
PCT Pub. Date: Jun. 3, 2021

(65) Prior Publication Data
US 2021/0326021 A1 Oct. 21, 2021

(30) Foreign Application Priority Data
Nov. 25, 2019 (CN) .......................... 201911167264.5

(51) Int. Cl.
*G06F 3/041* (2006.01)
*G02B 5/30* (2006.01)

(52) U.S. Cl.
CPC ....... *G06F 3/04164* (2019.05); *G02B 5/3041* (2013.01); *G06F 2203/04102* (2013.01)

(58) Field of Classification Search
None
See application file for complete search history.

(56) References Cited

U.S. PATENT DOCUMENTS

| 10,503,295 B2 * | 12/2019 | Lee | G06F 3/04164 |
| 2011/0199320 A1 * | 8/2011 | Cho | G06F 3/04164 345/173 |
| 2011/0267284 A1 * | 11/2011 | Lee | G06F 3/04164 345/173 |

(Continued)

FOREIGN PATENT DOCUMENTS

| CN | 103246402 A | 8/2013 |
| CN | 203930747 U | 11/2014 |

(Continued)

*Primary Examiner* — Duane N Taylor, Jr.
(74) *Attorney, Agent, or Firm* — Soroker Agmon Nordman

(57) ABSTRACT

The disclosure provides a polarizer and a display panel. The polarizer is disposed in the display panel and includes a body layer and a touch control layer disposed on the body layer. The touch control layer includes a plurality of touch sensors. An area of the touch control layer is greater than or equal to an area of the display area of the display panel, and the touch control layer is electrically connected to the touch driver circuit by a wire. In the display panel, a bonding area of the touch control layer and touch units are disposed on a same layer, thereby reducing a non-display area.

10 Claims, 3 Drawing Sheets

(56) References Cited

U.S. PATENT DOCUMENTS

| | | | | |
|---|---|---|---|---|
| 2014/0138131 A1* | 5/2014 | Hao | ................. | G06F 3/041 |
| | | | | 174/257 |
| 2014/0375907 A1* | 12/2014 | Wu | ................. | G06F 3/04164 |
| | | | | 349/12 |
| 2016/0306472 A1* | 10/2016 | Park | ................. | H01L 51/5256 |
| 2018/0121002 A1* | 5/2018 | Kim | ................. | H01L 51/5237 |
| 2018/0307884 A1* | 10/2018 | Xu | ................. | G06F 3/041661 |
| 2020/0033972 A1 | 1/2020 | Huang et al. | | |
| 2020/0212071 A1* | 7/2020 | Guo | ................. | H01L 29/78648 |

FOREIGN PATENT DOCUMENTS

| | | |
|---|---|---|
| CN | 204392220 U | 6/2015 |
| CN | 205281032 U | 6/2016 |
| CN | 106055159 A | 10/2016 |
| CN | 107703664 A | 2/2018 |
| CN | 108877543 A | 11/2018 |
| CN | 209357039 U | 9/2019 |
| CN | 110471560 A | 11/2019 |
| CN | 209674141 U | 11/2019 |

* cited by examiner

POLARIZER AND DISPLAY PANEL

FIELD

The present disclosure relates to the field of electronic display and, more particularly, relates to a polarizer and a display panel.

BACKGROUND

Typically, there are three methods for integrating touch function into a display panel, namely, an out-cell technology, an in-cell technology, and an on-cell technology. Compared to the in-cell technology and the out-cell technology, the on-cell technology has advantages such as a simple manufacturing process, low cost, and high transmittance. As a result, the on-cell technology has become a preferred method applied to current electronic devices.

In convention on-cell technology, touch sensors are generally disposed on a color filter and are bonded onto a display driver module by a flexible circuit board. To realize it, a bonding area needs to be disposed on a glass plate of the color filter so that the touch sensors on the color filter can be electrically connected to a touch driver circuit. However, the bonding area cannot display images, which reduces a screen-to-body ratio of display panels Conventional on-cell technology is suitable for a variety of display panels, for example, organic light-emitting diode (OLED) display panels and liquid crystal display (LCD) panels. Referring to FIG. 1, FIG. 1 is a schematic view showing a structure of a conventional display panel which may be an OLED or an LCD. Typically, the display panel includes a substrate 110, a first polarizer 120, a thin film transistor layer 130, a color filter 140, a second polarizer 150, a control circuit 180, and a flexible circuit board and a touch structure which are configured to connect the display panel with the control circuit 180. The touch structure includes a plurality of touch sensor units disposed on the color filter 140 and a touch driver circuit 170 integrated on the control circuit 180.

Since the touch driver circuit 170 is integrated on the control circuit 180, a bonding area needs to be disposed on the color filter 140 to realize an electrical connection between the touch sensor units and the touch driver circuit 170 by the flexible circuit board. Nonetheless, the above design not only complicates circuits of the flexible circuit board, but also occupies a region on the color filter and reduces a screen-to-body ratio of display panels.

SUMMARY

The present disclosure provides a polarizer and a display panel. A bonding area of a touch control layer and touch units are disposed on a same layer, which reduces a non-display area of the display panel.

To solve the above problem, the present disclosure provides a polarizer, including a body layer and a touch control layer disposed on the body layer. The polarizer is disposed on a display panel, the touch control layer includes a plurality of touch sensors, an area of the touch control layer is greater than or equal to an area of a display area of the display panel, and the touch control layer is electrically connected to a touch driver circuit by a plurality of wires.

An area of the touch control layer is greater than or equal to an area of a display area of the display panel, and the touch control layer is electrically connected to a touch driver circuit by a plurality of wires.

According to one aspect of the present disclosure, the touch driver circuit is disposed on the body layer of the polarizer, is disposed adjacent to the touch control layer, and is electrically connected to the touch sensors by the wires.

The touch driver circuit is electrically connected to a control circuit of the display panel by a flexible circuit board.

According to one aspect of the present disclosure, the touch driver circuit is integrated on a flexible circuit board, an end of the flexible circuit board is electrically connected to the touch sensors by a plurality of lines, and the other end of the flexible circuit board is electrically connected to a control circuit of the display panel.

According to one aspect of the present disclosure, materials of the touch sensors are transparent conductive materials, and materials of the wires are transparent conductive materials.

According to one aspect of the present disclosure, the polarizer is a rectangle having a first lateral edge and a second lateral edge which are perpendicular to each other. The touch sensors forming the touch control layer are a plurality of right triangles having same sizes, first legs of the triangles are parallel to the first lateral edge of the polarizer, second legs of the right triangles area parallel to the second lateral edge of the polarizer, and hypotenuses of the right triangles are parallel to each other.

Centers of adjacent two of the touch sensors are symmetrical to each other.

According to one aspect of the present disclosure, =lengths of the first legs are greater than or equal to sixty percent of a length of the first lateral edge.

According to one aspect of the present disclosure, lengths of the second legs are less than or equal to 1 cm.

According to one aspect of the present disclosure, a distance between any two adjacent of the touch sensors is less than or equal to 1 cm.

Correspondingly, the present disclosure further provides a display panel, comprising a polarizer. The polarizer includes a body layer and a touch control layer disposed on the body layer, and the touch control layer includes a plurality of touch sensors.

An area of the touch control layer is greater than or equal to an area of a display area of the display panel, and the touch control layer is electrically connected to a touch driver circuit by a plurality of wires.

According to one aspect of the present disclosure, the display panel includes a liquid crystal display panel or an organic light-emitting diode display panel.

Regarding the beneficial effects: the present disclosure improves a touch control layer of the on-cell technology, a plurality of touch sensors, which form a touch driver circuit, and a touch driver circuit are disposed on a same polarizer. There are two advantages of the design: First, since the touch sensors and the touch driver circuit are disposed on the same polarizer, the touch sensors and the touch driver circuit may be electrically connected by metal wires. Compared to conventional technology, a connecting structure between the touch sensors and the touch driver circuit of the present disclosure is simplified. Second, since the touch driver circuit is disposed on the polarizer, the touch driver circuit will not occupy a display area of a display panel. Therefore, the display area is enlarged, and a screen-to-body ratio of the display panel is increased.

DETAILED DESCRIPTION

Figure 1:
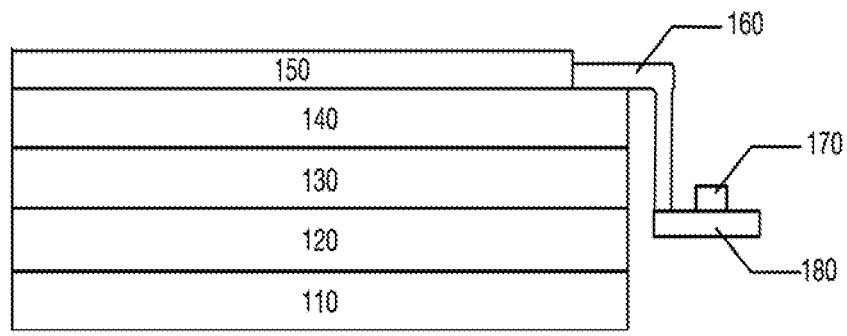
FIG. 1 is a schematic view showing a structure of a conventional display panel.

The following description of the various embodiments is provided with reference to the accompanying drawings. It should be understood that terms such as "upper", "lower", "front", "rear", "left", "right", "inside", "outside", "lateral", as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In the drawings, the identical or similar reference numerals constantly denote the identical or similar elements or elements having the identical or similar functions.

To solve the above problem, the present disclosure provides a polarizer and a display panel. A bonding area of a touch control layer and touch units are disposed on a same layer, thereby reducing a non-display area of the display panel.

Figure 2:
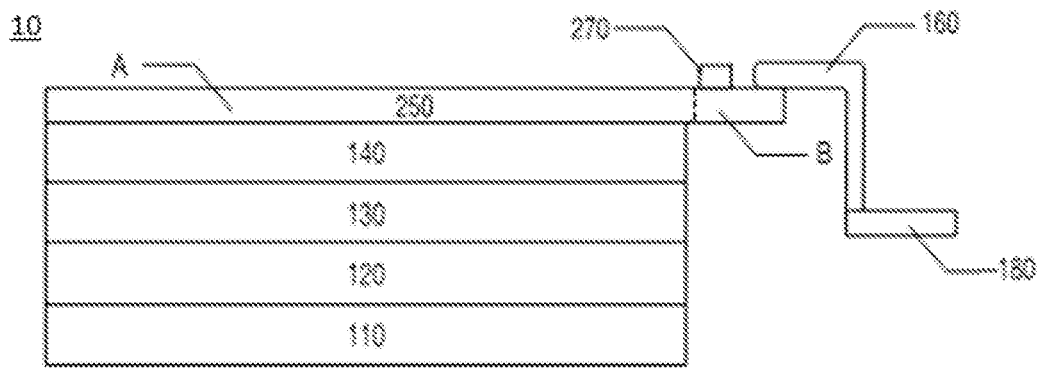
FIG. 2 is a schematic view showing a structure of a display panel according to a specific embodiment of the present disclosure.
Figure 3:
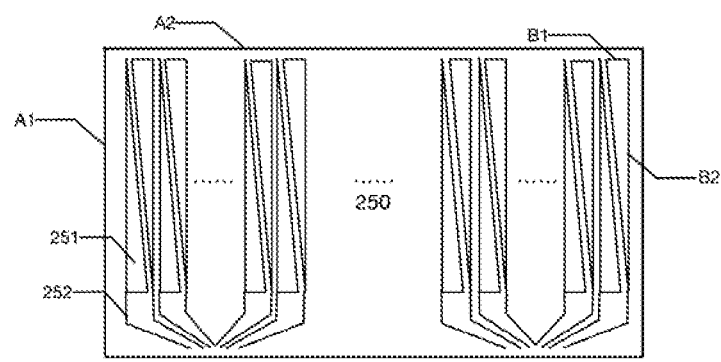
FIG. 3 is a schematic view showing a structure of a polarizer according to a specific embodiment of the present disclosure.
Figure 4:
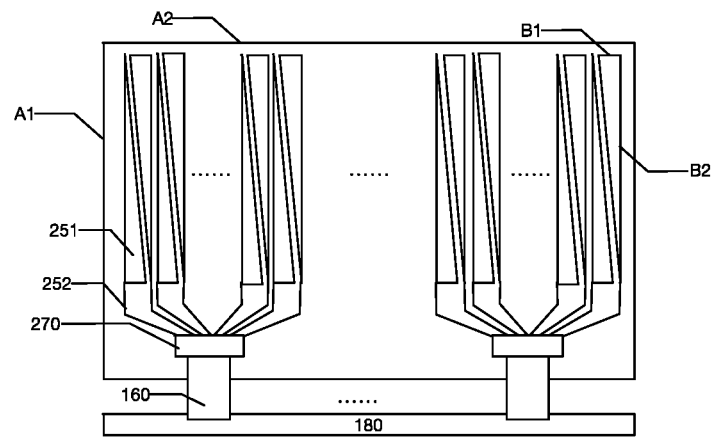
FIG. 4 is a top view of FIG. 2.
Figure 5:
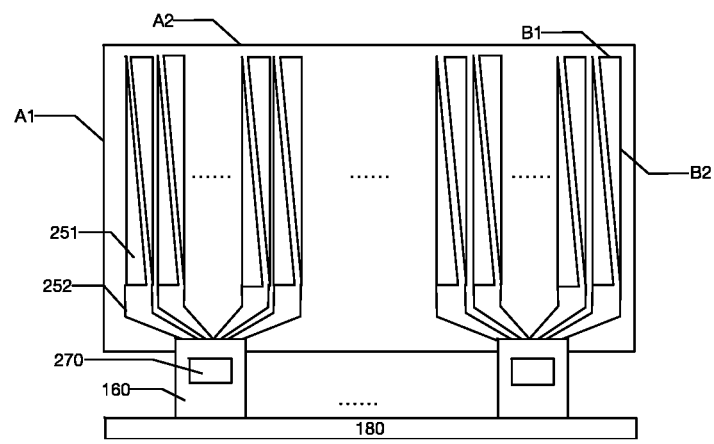
FIG. 5 is a top view showing a display panel according to another embodiment of the present disclosure.

The present disclosure is illustrated in detail below with reference to accompanying drawings. Referring to FIG. 2 to FIG. 5, FIG. 2 is a schematic view showing a structure of a display panel according to a specific embodiment of the present disclosure, FIG. 3 is a schematic view showing a structure of a polarizer according to a specific embodiment of the present disclosure, FIG. 4 is a top view of FIG. 2, and FIG. 5 is a top view showing a display panel according to another embodiment of the present disclosure.

Referring to FIG. 2 and FIG. 3, the present disclosure provides a polarizer and a display panel on which the polarizer is disposed. The polarizer of the present disclosure may be used in a variety of conventional display panels, for example, LCD panels, OLED panels, and quantum dots light-emitting diode displays (QLEDs). In the present disclosure, because the polarizer is independent from other structures of the display panel, the structures of the display panel are briefly described here.

A display panel 10 of the present embodiment includes a substrate 110, a first polarizer 120, a thin film transistor layer 130, a color filter 140, a polarizer 250, a control circuit 180, and a flexible circuit board 160 configured to connect the display panel with the control circuit 180. A touch structure is integrated on the polarizer 250.

Figure 6:
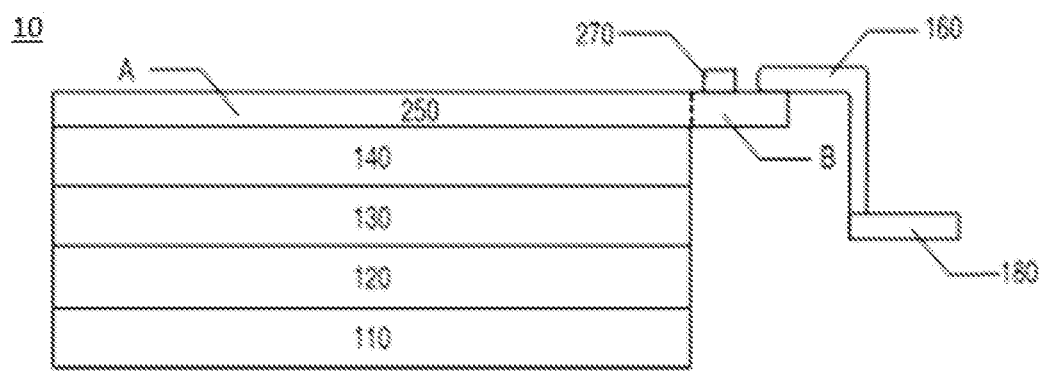
FIG. 6 is a schematic view showing a structure of a display panel of a specific embodiment of the present disclosure.

In the present disclosure, the polarizer 250 includes a body layer B and a touch control layer A which are disposed in a side-by-side manner. The touch control layer A includes a plurality of control sensors 251. As shown in FIG. 2, an area of the touch control layer A is greater than an area of a display area of the display panel 10, and the touch control layer A is electrically connected to the control driver circuit 270 by a wire 252. As shown in FIG. 6, the area of the touch control layer A may also be equal to the area of the display area of the display panel 10.

In one embodiment of the present disclosure, as shown in FIG. 2 and FIG. 4, the touch driver circuit 270 is disposed on the body layer B of the polarizer 250 and is electrically connected to the touch sensors 251 by the wire 252. The touch driver circuit 270 is electrically connected to a control circuit 180 of the display panel 10 by the flexible circuit board 160.

In another embodiment of the present disclosure, as shown in FIG. 5, the touch driver circuit 270 is integrated on the flexible circuit board 160. An end of the flexible circuit board 160 is electrically connected to the touch sensors 252 by a line, and the other end of the flexible circuit board 160 is electrically connected to the control circuit 180.

In the present disclosure, materials of the touch sensors 251 are transparent conductive materials, and materials of the wires 252 are transparent conductive materials. The transparent conductive materials may be indium tin oxide (ITO) or other materials with similar characteristics.

In the present disclosure, the polarizer 250 is a rectangle having a first lateral edge A1 and a second lateral edge A2 which are perpendicular to each other. The touch sensors 251 forming the touch control layer A are a plurality of right triangles having same sizes, first legs B1 of the triangles are parallel to the first lateral edge A1 of the polarizer, second legs B2 of the right triangles area parallel to the second lateral edge A2 of the polarizer, and hypotenuses of the right triangles are parallel to each other. Centers of adjacent two of the touch sensors 251 are symmetrical to each other.

In the present disclosure, lengths of the first legs B1 are greater than or equal to sixty percent of a length of the first lateral edge A1. Therefore, a touch function may be realized by simply a row of the touch sensors 251. Compared to two-dimensional distributed sensors in conventional technology, the present disclosure effectively reduces complexity of the wire 252.

In the present disclosure, lengths of the second legs B2 are less than or equal to 1 cm. A distance between any two adjacent of the touch sensors 251 is less than or equal to 1 cm so that touch accuracy of the touch control layer A may be ensured. In the present disclosure, the touch sensors 251 are a plurality of right triangles having same sizes. Centers of adjacent two sensors 251 are symmetrical to each other, that is, adjacent two sensors 251 are two-by-two and complement each other to form a rectangle, as shown in FIG. 3 and FIG. 4. The complementary right triangles ensure coordinates of touchpoints according to changes in capacitance, and lengths and positions of hypotenuses of the complementary right triangles.

The present disclosure may effectively simplify a structure of the wire 252 without reducing touch accuracy, which is a prerequisite for disposing the polarizer 250 on a touch driver circuit 270. Since the wire 252 is disposed on the polarizer 250, the wire 252 cannot be isolated by other insulating structures. Therefore, if there are too many wires 252, the structure will be complicated, and touch signals will be chaos and cannot be recognized because of interference between the wires 252. Consequently, the above technical solution may be realized only by improving the structure of the wire 252 on the touch sensors 251, which means a number of the wires 252 need to be reduced.

The present disclosure improves a touch control layer of the on-cell technology. A plurality of touch sensors, which form a touch driver circuit, and a touch driver circuit are disposed on a same polarizer. There are two advantages of such design: First, since the touch sensors and the touch driver circuit are disposed on the same polarizer, the touch sensors and the touch driver circuit may be electrically connected by metal wires. Compared to conventional technology, a connecting structure between the touch sensors and the touch driver circuit of the present disclosure is simplified. Second, since the touch driver circuit is disposed on the polarizer, the touch driver circuit will not occupy a display area of a display panel. Therefore, the display area is enlarged, and a screen-to-body ratio of the display panel is increased.

To sum up, the present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A polarize, disposed on a color filter of a display panel, comprising a body layer and a touch control layer which are disposed in a side-by-side manner;
    wherein the body layer is disposed outside a display area of the display panel:
    wherein the touch control layer comprises a plurality of touch sensors; and
    wherein an area of the touch control layer is greater than or equal to an area of the display area of the display panel, and the touch control layer is electrically connected to a touch driver circuit by a plurality of wires.

2. The polarizer of claim 1, wherein the touch driver circuit is disposed on the body layer of the polarizer and is electrically connected to the touch sensors by the wires; and
    wherein the touch driver circuit is electrically connected to a control circuit of the display panel by a flexible circuit board.

3. The polarizer of claim 1, wherein the touch driver circuit is integrated on a flexible circuit board, an end of the flexible circuit board is electrically connected to the touch sensors by a plurality of lines, and the other end of the flexible circuit board is electrically connected to a control circuit of the display panel.

4. The polarizer of claim 1, wherein materials of the touch sensors are transparent conductive materials, and materials of the wires are transparent conductive materials.

5. The polarizer of claim 1, wherein the polarizer is a rectangle having a first lateral edge and a second lateral edge which are perpendicular to each other, the touch sensors forming the touch control layer are a plurality of right triangles having same sizes, first legs of the triangles are parallel to the first lateral edge of the polarizer, second legs of the right triangles area parallel to the second lateral edge of the polarizer, and hypotenuses of the right triangles are parallel to each other; and
    wherein centers of adjacent two of the touch sensors are symmetrical to each other.

6. The polarizer of claim 5, wherein lengths of the first legs are greater than or equal to sixty percent of a length of the first lateral edge.

7. The polarizer of claim 6, wherein lengths of the second legs are less than or equal to 1 cm.

8. The polarizer of claim 6, wherein a distance between any two adjacent of the touch sensors is less than or equal to 1 cm.

9. A display panel, comprising a polarizer disposed on a color filter of the display panel;
    wherein the polarizer comprises a body layer and a touch control layer which are disposed in a side-by-side manner, the body layer is disposed outside a display area of the display panel, and the touch control layer comprises a plurality of touch sensors; and
    wherein an area of the touch control layer is greater than or equal to an area of the display area of the display panel, and the touch control layer is electrically connected to a touch driver circuit by a plurality of wires.

10. The display panel of claim 9, wherein the display panel comprises a liquid crystal display panel or an organic light-emitting diode display panel.

* * * * *